United States Patent

[11] 3,555,259

[72] Inventor Daniel Silverman
Tulsa, Okla.

[21] Appl. No. 695,138
[22] Filed Jan. 2, 1968
[45] Patented Jan. 12, 1971
[73] Assignee Pan American Petroleum Corporation
Tulsa, Okla.
a corporation of Delaware

[54] ELECTRONIC OPTICAL DATA PROCESSING SYSTEM
11 Claims, 4 Drawing Figs.

[52] U.S. Cl. ........................................................ 235/181, 178/6.8; 235/198; 340/172.5
[51] Int. Cl. ........................................................ G06g 7/19
[50] Field of Search ............................................ 235/181, 198, 197; 340/173, 172.5; 343/5, 6, 17

[56] References Cited

UNITED STATES PATENTS

| | | | |
|---|---|---|---|
| 3,127,607 | 3/1964 | Dickey .......................... | 343/6X |
| 3,211,898 | 10/1965 | Fomenko ...................... | 235/181 |
| 3,314,052 | 4/1967 | Lohmann ...................... | 235/181X |

*Primary Examiner*—Malcolm A. Morrison
*Assistant Examiner*—Felix D. Gruber
*Attorneys*—Paul F. Hawley and Newell Pottorf

ABSTRACT: An electro-optical system convolves two variable-density traces by two cathode-ray scanning means using the output of scanning of a first trace to vary the beam intensity while scanning the second. A stepping bias voltage delays one sweep relative to the other and also correspondingly positions an output light beam which integrates a running product of the two variable-density functions by making a photographic exposure on film.

DANIEL SILVERMAN
INVENTOR.

BY Newell Pottorf
ATTORNEY

ELECTRONIC OPTICAL DATA PROCESSING SYSTEM

BACKGROUND OF THE INVENTION

This invention relates to data processing and is directed to processing, with optical and electronic means, data functions recorded in the form of variable-density traces, generally without moving mechanical parts. More specifically, the invention is directed to convolving two functions such as seismic data traces, filter-operator functions, and the like, at the high speeds typical of electronic processors.

The term "convolution" is used herein in the general sense, with respect to data functions such as those having time as the independent variable, to means obtaining as a function of relative delay time the integrated product of the two functions. It thus includes such mathematical operations as auto-correlation, cross-correlation, filtering, and auto- and cross-convolution in the narrow sense of combining two functions for which the order of occurrence of events in time takes place in relatively opposite senses. All of these processes involve the same basic mathematical operations of multiplying, integrating, and varying the relative time delay of two functions, and they differ primarily only in the nature of the functions or the manner of sampling for the multiplication step.

Convolution processes in the general sense have gained acceptance as highly efficient ways of separating signals from noise or resolving signals which overlap in time. Not only is it possible to achieve, by digital computation or analogue computing devices, the same effects as are obtainable by simple electrical filters, but it is also possible to design and apply filter functions and the like completely unrealizable by any simple electrical network. Familiar examples in the field of seismic geophysical surveying are cross-correlation and Weiner filtering, either of which is able to compress and resolve long-duration seismic signals that almost completely overlap each other in time, at the same time strongly discriminating against random noise.

A problem encountered in the use of convolution processes, such as time-domain filtering and cross-correlation, is that the multiplying of the convolved functions requires either an inordinate amount of expensive digital computer time, or is difficult to carry out accurately and rapidly with analogue equipment. Certain forms of optical analyzers utilizing the data in the form of variable-density traces have advantages over digital and other forms of analogue correlators or convolution systems; but they frequently require, for timing accuracy, somewhat cumbersome and expensive mechanisms for handling the variable-density function films.

In view of this, it is a primary object of my invention to provide an improved optical data processing system with extremely high speeds of operation, essentially electronic in nature and capable of operating either without the use of moving mechanical parts, or using only relatively simple mechanisms.

STATEMENT OF THE INVENTION

The foregoing and other objects are accomplished in my invention by using cathode-ray tube beams as the means for scanning the variable-density functions to be convolved and for performing the multiplication, and employing cumulative exposure of photographic film as the mode of integrating the varying light intensity resulting from multiplication. In particular, a first constant-intensity cathode-ray tube beam scans a first variable-density function to produce a first varying light output, which is employed to correspondingly vary the intensity of the beam of a second cathode-ray tube. The varying-intensity beam of the second tube scans the second variable-density function and is accordingly further modulated thereby. The resultant light intensity variations, which are a function of the product of the two functions, directly or indirectly during each scan produce cumulative exposure at a point on a photographic film, the point of exposure being shifted following each cathode-ray beam multiplying scan. The relative delay time for the scans is correspondingly varied in increments, by adding increments of bias voltage to one of the cathode-ray sweep functions. This produces a variable-density output trace showing the integrated product of the two functions as a function of the relative delay time.

By applying a transverse scan to the various cathode-ray beams at a quite high frequency, relative to the scanning rate in the time dimension of the variable-density functions, convolution of a large number of variable-density traces may be carried out essentially simultaneously. In this case, the exposure of the integrating film will ordinarily be performed by a third cathode-ray tube for which the beam is synchronized with the high-frequency cross-scanning of the multiple variable-density traces, but for which the scan in the time dimension corresponds to the relative time delay. Alternatively, for the convolution of only two traces, the third cathode-ray tube may be dispensed with or replaced by a variable-density camera or other means, which records directly on film moved by a simple mechanism in accordance with relative delay time of the two functions.

BRIEF DESCRIPTION OF THE DRAWINGS

This will be better understood by reference to the accompanying drawings forming a part of this application and showing a preferred embodiment and modifications. In these drawings.

DESCRIPTION OF THE PREFERRED EMBODIMENT

Figure 1:
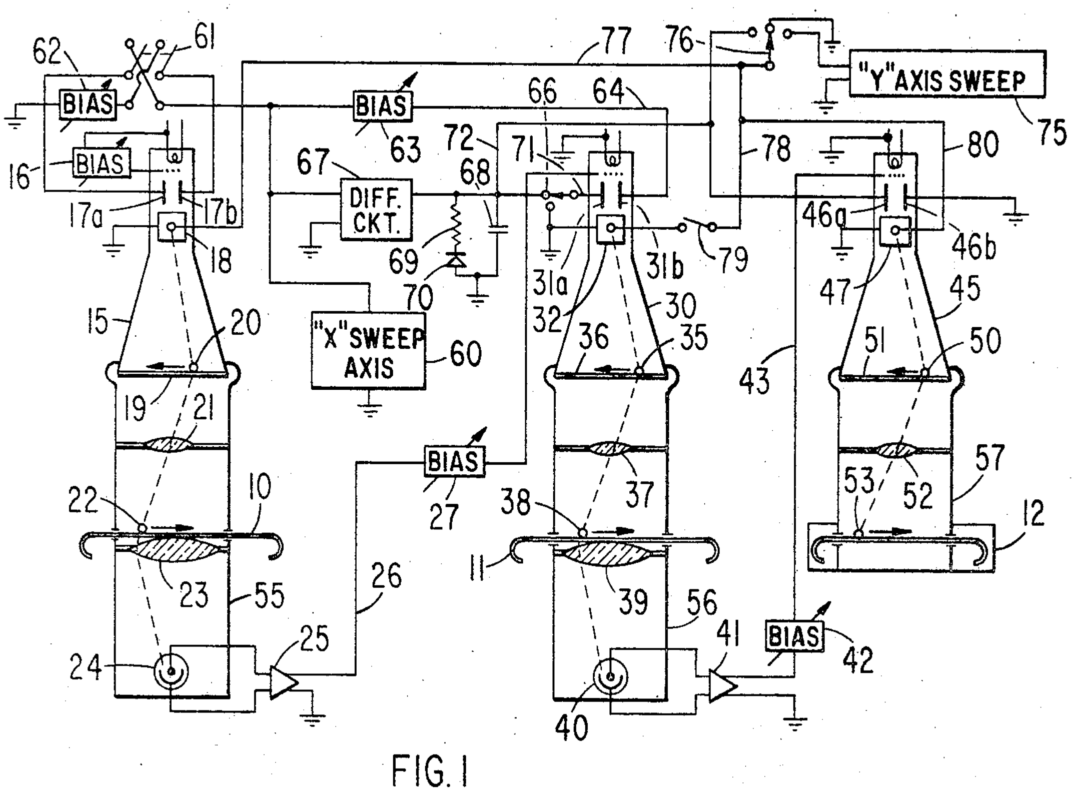
FIG. 1 is a circuit diagram of a preferred embodiment of the invention.

Referring now to the drawing and particularly to FIG. 1 thereof, it is assumed that the two functions to be convolved are respectively recorded as variable-density traces on a first film 10 and a second film 11, and that the film 12 is an unexposed film on which is to be recorded a variable-density trace representing the convolution of traces 10 and 11. For scanning film 10 to obtain a correspondingly varying light output, there is provided a first cathode-ray tube 15 having a beam intensity grid connected to an adjustable bias voltage source 16, a pair of X deflecting plates 17*a*, 17*b*, and a pair of Y deflecting plates 18. On the screen 19 of tube 15, is produced a scanning light spot 20 movable in the plane of the drawing, as indicated by the arrow, by a sweep voltage applied to X deflection plates 17*a*, 17*b*. By a lens 21, light from spot 20 is focused to a scanning spot 22 which moves along one trace of the film 10 in the direction of its time dimension. A lens 23 focuses the light of spot 22, transmitted through film 10, to a photocell or photomultiplier 24 coupled to the input of an amplifier 25. The output of amplifier 25 is connected by a lead 26 to a source of adjustable bias voltage 27 and thence to the beam-intensity control grid of a second cathode-ray tube 30 adapted to provide scanning of the second variable-density film 11.

Corresponding to tube 15, cathode-ray tube 30 has X deflecting plates 31*a*, 31*b* and Y deflection plates 32 perpendicular thereto. A scanning light spot 35 appears on screen 36 of tube 30 and is focused by a lens 37 to a scanning spot 38 at the surface of film 11. The illumination form spot 38 transmitted through film 11 is focused by a lens 39 onto a photocell or photomultiplier 40 connected to the input of an amplifier 41. The output of amplifier 41 is connected through a source of adjustable bias voltage 42 by a lead 43 to the beam-intensity control grid of a third cathode-ray tube 45. Tube 45 has X deflecting plates 46*a*, 46*b* and Y deflecting plates 47. The scanning spot 50 appearing on screen 51 of tube 45 is focused by a lens 52 onto the surface of film 12 at point 53. Housings 55, 56 and 57 surround the various optical elements associated with the respective tubes 15, 30 and 45 to exclude stray light.

Sweep voltage for the X deflection plates is provided by a sawtooth voltage generator 60 connected a two-pole reversing switch 61 to one of X deflection electrodes 17*a* and 17*b*, the other electrode being connected through switch 61 and an adjustable bias source 62 to ground. Sweep generator 60 is also connected through an adjustable bias source 63 by a conductor 64 to X deflection plate 31*b* of tube 30. The output of generator 60 is also applied to a differentiating circuit 67, the output of which is applied to a condenser 68 extending to ground in parallel with a resistance 69 and diode 70. The voltage appearing on condenser 68 is applied through a two-position switch 66 and a lead 71 to X deflection electrode 31*a* of tube 30, and by a lead 72 to X deflection electrode 46*a* of tube 45.

Voltage for a Y axis sweep is provided by a generator 75 connected through a three-position selector switch 76 and lead 77 to Y deflection electrode 18 of tube 15 and through a lead 78 and switch 79 to Y deflection electrode 32 of tube 30. A lead 80 connects sweep generator 75 through switch 76 to Y deflection electrode 47 of tube 45.

The operation of this system is as follows: With switch 76 on the center or "ground" position, bias 16 adjusts the intensity of spot 20 to any convenient constant value in accordance with a desired gray scale. Scanning spot 22 accordingly has a constant intensity which is modulated by the variable density of the trace of film 10 as it scans along the trace time-dimension. The resulting varying intensity of illumination is detected by the photomultiplier 24 and is applied in conjunction with gray-level bias 27, to control the intensity of the beam of tube 30 in accordance with the density variations of film 10. Light source spot 35 and scanning spot 38 accordingly vary in intensity while spot 38 scans along the length of the trace of film 11, to have its varying intensity further modified by that trace. The resulting varying illumination representing the instantaneous product of the two functions represented by the traces of films 10 and 11 is detected by photomultiplier 40 and, in conjunction with gray-level bias 42, produces a correspondingly varying intensity for the beam of tube 45. This varying light intensity produces a cumulative photographic exposure at point 53 on film 12 representing the sum or integration of the instantaneous products of the two functions.

Figure 2:
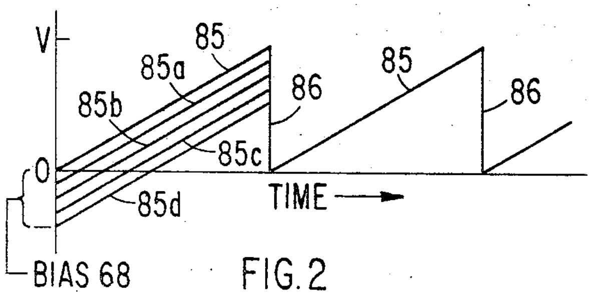
FIG. 2 is a graph showing sweep voltages and time relationships occurring in the operation of the embodiment of FIG. 1.

As the X deflections of the beams of tubes 15 and 30 are both produced by the same sweep generator 60, they occur in synchronism except as their relative instantaneous positions may be adjusted by bias source 62 and 63. An additional bias voltage, having the effect of a relative time delay, is provided by the voltage applied to electrode 31*a* in the following way: referring now to FIG. 2, and assuming for the moment that biases 62 and 63 are constant or zero, lines 85 and 86 respectively represent the rising and falling portions of the sawtooth voltage wave of generator 60 Differentiating circuit 67 is arranged to be energized during the falling portion 86 of each voltage sweep. The output of circuit 67 is a current impulse of constant amplitude, which is applied as a charge to condenser 68 and produces a corresponding voltage increment on X deflection plate 31*a* in opposition to the voltage of generator 60. Resistance 69 and diode 70 provide a high-resistance path to ground for electrode 31*a*, the diode acting to prevent discharging of condenser 68 through resistor 69.

Figure 3:
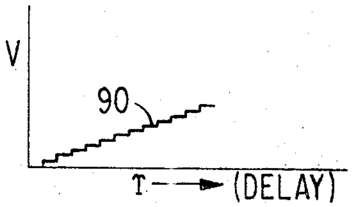
FIG. 3 is a graph of the relative delay voltage as a function of time.

These current impulses cause the voltage on condenser 68 to rise in an incremental or stair-step manner, as shown by curve 90 of FIG. 3. Accordingly, while the voltage applied to plates 17*a*, 17*b* of tube 15 follows curve 85 for each sweep, that between plates 31*a* and 31*b* of tube 30, as affected by the stepping voltage of condenser 68, successively corresponds to curves 85, 85*a*, 85*b*, 85*c*, 85*d*, and so on. As is evident in FIG. 2, the effect of bias voltage 68, in opposition to the sweep voltage varying between zero and V, is to progressively delay each successive scan of light spot 38 along film 11 relative to the scanning of spot 22 along film 10. This change in bias 68 accordingly represents the delay time $\tau$ of FIG. 3 and is therefore applied by lead 72 to the plate 46*a* of tube 45 to step exposure point 53 along film 12 in accordance with the relative delay time in the scanning of functions 10 and 11. There accordingly appears on film 12, after photographic processing, a variable-density trace representing the convolution of functions 10 and 11 as a function of relative delay time.

Figure 4:
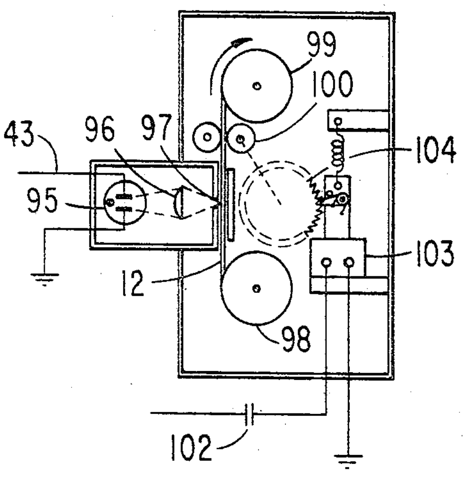
FIG. 4 is a diagrammatic cross section of an alternative form of integrating and output trace-recording apparatus.

In FIG. 4, is shown a simple mechanism for producing a variable-density trace like that produced by tube 45 but in a different way. The varying voltage on lead 43, of FIG. 1 representing the instantaneous product of functions 10 and 11, is applied to a glow-tube light source 95 illuminating film 12 through a condenser 96 and slit 97, the film being drawn from a supply spool 98 to a takeup spool 99 by pinch rollers 100 and 101. The stepwise increasing voltage on lead 72 is applied through a condenser 102 to a solenoid 103 actuating a ratchet gear 104 to drive roller 100 and thus advance film 12 one increment for each increment of delay time. In some instances it may be possible to omit photomultiplier 40, amplifier 41, and bias 42 and simply focus the beam transmitted through lens 39 directly onto slit 97.

In the processing of seismic data, it is frequently desirable to make static and/or dynamic corrections of one trace with respect to another or with respect to some predetermined datum or zero time. This is accomplished in a simple manner while performing convolution operations with this system, by adjusting bias 62 or 63 by a constant amount to provide a static correction, and by an amount which varies during each trace scan to provide a dynamic correction.

The system has so far been described assuming that each of films 10 and 11 contains only a single variable-density trace. If each film has a number of parallel side-by-side traces, a simultaneous convolution of the traces of one film by the corresponding traces of the other can be performed utilizing Y-axis sweep generator 75. Generator 75 provides Y deflection voltages like the sawtooth waveform of generator 60 but at a much higher frequency. Thus, with switch 76 thrown to the right and switch 79 closed, Y-axis generator 75 sweeps spots 22, 38 and 53 in a direction perpendicular to the plane of the drawing, across the respective traces of films 10 and 11 and the respective integrating spots on film 12, at a high rate compared to the sweep of spots 22 and 38 in the time dimension of the traces. Accordingly, each point on each trace of film 10 is multiplied by the corresponding point of a corresponding trace on film 11 and produces a partial exposure at a corresponding point on film 12. Adjacent traces produce adjacent partial exposure points on film 12. As point 53 remains stationary except for the Y-axis sweep, during each complete sweep by the X generator 60 integrating, cumulative exposure points, one for each of the multiple traces, are produced side by side in the Y dimension on film 12. Thus, the resulting output film 12, after development, contains the same number of multiple traces as do the input films 10 and 11, which are swept by their respective spots driven by sweep 75.

A further mode of operation of this embodiment of the invention is produced by opening switch 79. This stops Y-axis scanning tube 30 so that scanning spot 38 moves in the X direction always along the same trace. This provides a convolution of the single trace on film 11 with each of the traces on film 10. This is appropriate if the function recorded on film 11 is a filter function or operator, for example, that is to be applied to all of the multiple traces of film 10.

The reversing switch 61 provides still further optional modes of operation. As the mathematical operations of convolutions (in the narrow sense) and correlation involve, in the one case, scanning functions 10 and 11 in the same direction with respect to the occurrence of the recorded variations in time and, in the other case, in respectively opposite directions relative to the occurrence of events in time, the setting of switch 61 determines whether scanning spots 22 and 38 move in the same direction, as suggested by the arrows, or in the respectively opposite directions. That is, one position of switch 61 produces convolution of the two functions on films 10 and 11, while the other position of switch 61 produces correlation of the functions as the output trace or traces on film 12. Obviously, the showing of switch 61 is diagrammatic only, as the same effect could be obtained by physically withdrawing either film 10 or 11 from the holder shown and reversing it end to end, thus reversing the apparent relative time sequence.

A still further mode of operation is possible to accomplish what is termed in seismic record processing "applying static and dynamic corrections." These involve, in the first case, shifting an entire trace by a fixed time value; and, in the second case, shifting certain portions of a trace with respect to other portions to provide a nonlinear time scale. Enclosure 57 with its unexposed film 12 places enclosure 56 and its contents in front of face 36 of tube 30. Switch 76 is thrown to the left, switch 79 is closed, and switch 66 is thrown to connect lead 71 and electrode 31*a* to ground.

In this configuration, assuming that film 10 is a multiple-trace variable-density seismic record or cross section, the stepping voltage of lead 72 is applied to the Y-deflection plates of tubes 15 and 30 to shift spots 22 and 53 one trace width at the end of each X scan. Thus, each trace of record 10 is transferred to a corresponding position on unexposed film 12 (now assumed to be in front of face 36). Adjusting bias 62 by a fixed amount, which may be different for each trace, produces a shift corresponding to a static correction, while appropriately varying bias 63 during each X scan of spots 20 and 35 performs the dynamic correction.

While I have described my invention in terms of the foregoing specific and preferred embodiment and modifications thereof, it is apparent that still further changes and modifications can be made employing the disclosed principles of the invention. Accordingly, the invention should not be considered as limited to the details described, but its scope is properly to be ascertained from the appended claims.

I claim:

1. A processing system for data recorded in the form of variable-density traces comprising:
- a first and a second cathode-ray tube respectively producing a first and a second luminous source;
- means to cause a constant-intensity first spot of light from said first luminous source to scan along a first variable-density trace;
- means to detect variations in the light intensity received from said first spot of light caused by corresponding density variations along said first trace;
- means responsive to said detected light variations for correspondingly varying the intensity of said second luminous source;
- means to cause a varying-intensity second spot of light from said second luminous source to scan along a second variable-density trace in timed relation to the scanning of said first trace by said first spot of light;
- means responsive to the resultant variations in light intensity received from said second spot of light, caused both by the variations in intensity of said second luminous source and by the density variations of said second trace, to expose a point on a photosensitive surface in proportion to the total luminous energy detected during each scan of said second trace;
- means to delay the scanning of one of said traces relative to the scanning of the other by a time interval that remains substantially constant during each scan; and
- means to progressively and incrementally change said delay for successive scans and to shift said point of exposure in proportion to said delay to produce a variable-density output trace representing the convolution of said scanned traces as a function of said relative delay.

2. An optical data processing system as in claim 1, in which said scan-causing means is a single source of sweep-generating voltage connected to the X beam-deflecting electrodes of both of said cathode-ray tubes, and said delay means is a source of bias voltage connected to an X beam-deflecting electrode of one of said cathode-ray tubes.

3. A system as in claim 2 in which said incremental delay-changing means is a means actuated by said sweep-generating source to vary said delay bias voltage by incremental steps.

4. An optical data processing system as in claim 1, in which said point-exposing means is a third luminous source of a third cathode-ray tube and said shifting means comprises an electrical connection between said delay bias voltage source and an X beam-deflecting electrode of said third cathode-ray tube.

5. An optical data processing system as in claim 4, wherein said data are recorded in the form of a plurality of side-by-side variable-density traces, and wherein the system includes a source of Y-axis sweep voltage connected to the Y-deflection electrodes of said first, second and third cathode-ray tubes, the repetition rate of said Y-axis sweep voltage being high compared to the repetition rate of scanning by said first and second spots of light along said variable-density traces.

6. An optical data processing system as in claim 5 including a switch for interrupting the connection between said source of Y-axis sweep voltage and said second cathode-ray tube, so that said second spot of light scans only along the length of a single variable-density trace.

7. An optical data processing system as in claim 1 in which said point-exposing means is a lens system for focusing the light of said second spot, as varied by said second trace, onto a photographic film, and including, means actuated by said delay-changing means to move said film one increment of distance for each increment of change of said delay.

8. An optical data processing system as in claim 1 in which said point-exposing means comprises a glow-tube and including:
- means for focusing the illumination produced by said glow-tube onto a photographic film; and
- means actuated by said delay-changing means to move said film in proportion to said changing delay.

9. An optical data processing system as in claim 1 including means to reverse the direction of scanning of one of said first and second spots relative to the other.

10. An optical data processing system as in claim 1 including means to adjust the average intensity of each of said first and second spots of light.

11. A processing system for data recorded in the form of variable-density traces comprising:
- a first and a second cathode-ray tube respectively producing a first and a second luminous source;
- an X-axis sweep voltage source connected to said first tube to cause a constant-intensity first spot of light from said first source to scan along a first variable-density trace;
- means to detect variations in the light intensity received from said first spot of light caused by corresponding density variations along said first trace;
- means responsive to said detected light intensity variations for correspondingly varying the intensity of said second luminous source;
- a connection between said X-axis sweep voltage source and said second tube to cause a varying intensity second spot of light from said second source to scan along the length of a second film in timed relation to the scanning of said first trace, said second film being a transparency bearing at least one variable-density function trace;
- at least one adjustable bias voltage source in the connection between said X-axis sweep voltage source and at least one of said tubes, to delay the scanning by one of said spots relative to the scanning by the other;
- means responsive to the resultant variations in light intensity of said second spot of light, passing through said transparency and caused by said variable-density function trace, to expose a point of on a photosensitive surface in proportion to the total luminous energy passing through said transparency during each X-axis scan of said first and second spots of light; and
- means to position said point of exposure in proportion to the value of said adjustable bias voltage.